United States Patent [19]
Hirotani

[11] Patent Number: 5,758,332
[45] Date of Patent: May 26, 1998

[54] INFORMATION SERVICE PROVIDING SYSTEM

[75] Inventor: Takayuki Hirotani, Yokohama, Japan

[73] Assignee: Casio Computer Co., Ltd., Tokyo, Japan

[21] Appl. No.: 459,969

[22] Filed: Jun. 2, 1995

[30] Foreign Application Priority Data

Jun. 30, 1994 [JP] Japan .................................. 6-173506

[51] Int. Cl.⁶ .................................................. G06F 15/30
[52] U.S. Cl. ............................. 707/1; 364/401; 364/407; 395/200.09
[58] Field of Search .................................. 364/401, 407, 364/900; 395/601, 200.09

[56] References Cited

U.S. PATENT DOCUMENTS

| | | | |
|---|---|---|---|
| 4,247,908 | 1/1981 | Lockhart, Jr. et al. | 364/900 |
| 5,021,953 | 6/1991 | Webber et al. | 364/407 |
| 5,191,523 | 3/1993 | Whitesage | 364/407 |
| 5,339,239 | 8/1994 | Manabe et al. | 364/401 |
| 5,469,496 | 11/1995 | Emery et al. | 379/58 |

FOREIGN PATENT DOCUMENTS

| | | | |
|---|---|---|---|
| WO/89/07798 | 8/1989 | WIPO | G06F 15/22 |
| WO/94/10502 | 5/1993 | WIPO | G06F 15/26 |

*Primary Examiner*—Wayne Amsbury
*Assistant Examiner*—Jean M. Corriélus
*Attorney, Agent, or Firm*—Frishauf, Holtz, Goodman, Langer & Chick

[57] ABSTRACT

An information service providing system using a network comprises a terminal group, an information processing center, and various types of databases. When a portable terminal transmits the category of information service and the retrieval condition data to the information processing center, the center selects the necessary database on the basis of the category of service and searches the databases selected in a chain reaction manner using a retrieval result as the next retrieval condition so as to fulfill the retrieval conditions. Then, the center outputs the retrieval results of the databases to the terminal.

15 Claims, 23 Drawing Sheets

| AIRLINE | PLACE | | TIME | | | FARE |
|---|---|---|---|---|---|---|
| | FROM | TO | DAY | FROM | TO | |
| UA | SFC<br>SFC<br>SFC | NRT<br>HNL<br>NYK | EVERY DAY | 2:30P.M. | 6:30P.M. | $600.- |
| | LA<br>LA | NRT<br>PKG | EVERY DAY<br>TUE. WED. | | | $800.- |
| | | | | | | |

FIG.4

| AIRLINE | PLACE | | TIME | | | FARE |
|---|---|---|---|---|---|---|
| | FROM | TO | DAY | FROM | TO | |
| JAL | NRT<br>NRT | NYK<br>PRS | | | | $1,200- |
| | SFC | NRT | EVERY DAY | 9:30P.M. | 1:30P.M. | $1,000- |
| | | | | | | |

FIG.5

|  | PLACE | | TIME | | FARE |
|---|---|---|---|---|---|
|  | FROM | TO | FROM | TO |  |
| JR TOKAI | NARITA | KYOTO | 5:30 A.M.<br>5:45 A.M. | 9:30P.M.<br>9:50P.M. | ¥ 20,000- |
|  | TOKYO | MATUMOTO | 6:00 A.M. | 11:00A.M. |  |
|  |  |  |  |  |  |

FIG.6

| AA | NYK NYK ...... | LND PRS | EVERY DAY | | | $400- |
|---|---|---|---|---|---|---|
| | ...... | | | | | |

FIG.7A

| SEIBU BUS | TOKYO NAGOYA | | | | | ¥ 15.000- |
|---|---|---|---|---|---|---|
| | TOKYO KYOTO ...... | | | | | |

FIG.7B

RETRIEVAL CONDITIONS (USER INPUT INFORMATION etc.)

| USER NUMBER | 12345 |
|---|---|
| CATEGORY | TRAVEL |
| DEPARTURE PLACE | SFC |
| DEPARTURE DATE & TIME | JUNE 27, 2:30 P.M. |
| DESTINATION | KYOTO |
| ARRIVAL DATE & TIME | JUNE 27, 2:30 P.M. |
| DESIRED TRANSPORTATION | |
| CLASS | FIRST CLASS (OR ECONOMY CLASS) |
| | |
| | |

- MAJOR ITEMS: DEPARTURE PLACE, DEPARTURE DATE & TIME, DESTINATION
- SUB-ITEMS (OPTIONAL ITEMS): ARRIVAL DATE & TIME, DESIRED TRANSPORTATION, CLASS, ...

FIG.13

ACQUIRED INFORMATION

| | |
|---|---|
| $m_1$ | SFC |
| $m_2$ | UA    FLIGHT 123 |
| $m_3$ | JUNE 27    2:30 P.M. |
| $m_4$ | NARITA |
| $m_5$ | JUNE 28    6:30 P.M. |
| $m_6$ | $600 |
| $m_7$ | NARITA EX NO.8 |
| $m_8$ | JUNE 28    7:30 P.M. |
| $m_9$ | TOKYO |
| $m_{10}$ | JUNE 28    8:30 P.M. |
| $m_{11}$ | ¥1000 |
| $m_{12}$ | SHINKANSEN NO.41 |
| $m_{13}$ | JUNE 28    9:20 P.M. |
| $m_{14}$ | KYOTO |
| $m_{15}$ | JUNE 28    11:00 P.M. |
| $m_{16}$ | ¥20000 |

FIG.16

SEARCH RESULT NOTICE SERVICE

BLANK LINE →
BLANK LINE →

CATEGORY : TRAVEL

| | |
|---|---|
| UA | FLIGHT 123 |
| LEAVING SFC | JUNE 27 2:30 P.M. |
| ARRIVING AT NARITA | JUNE 28 6:30 P.M. |

¥63000($600)

BLANK LINE →

NARITA EX NO.8

| | |
|---|---|
| LEAVING NARITA | 7:30 P.M. |
| ARRIVING AT TOKYO | 8:30 P.M. |

¥1000($9.52)

BLANK LINE →

HIKARI NO.41

| | |
|---|---|
| LEAVING TOKYO | 9:20 P.M. |
| ARRIVING AT KYOTO | 11:00 P.M. |

¥20000($190.48)

BLANK LINE →

TOTAL TRAVEL EXPENSES   ¥84000($800)

| CHANGE | CENTER CALL | PHONE BOOK | SCHEDULE | TRANSMIS-SION |
|---|---|---|---|---|

FIG.17

SEARCH RESULT NOTICE SERVICE

CONTINUED FROM PRECEDING PAGE

| | |
|---|---|
| HIKARI | NO.41 |
| LEAVING TOKYO | 9:20 P.M. |
| ARRIVING AT KYOTO | 11:00 P.M. |
| | ¥20000($190.48) |
| TOTAL TRAVEL EXPENSES | ¥84000($800) |

[ RESERVE ]    [ CANCEL ]

[ DISPLAY CHANGE ]

| CHANGE | CENTER CALL | PHONE BOOK | SCHEDULE | TRANSMIS-SION |

FIG.20

I ⎧ UA
  ⎨          MON   LEAVING SF              2:30P.M.    $600-
  ⎪          TUE   ARRIVING AT NARITA      6:30P.M.
  ⎪ JAL
  ⎩
             MON   LEAVING SF              9:30A.M.    $1,000-
             TUE   ARRIVING AT NARITA      1:30P.M.

JR TOKAI

II ⎧ NARITA EX    LEAVING NARITA          3:00P.M.
   ⎪              ARRIVING AT TOKYO       4:00P.M.
   ⎪
   ⎨              LEAVING NARITA          8:00P.M.
   ⎪              ARRIVING AT TOKYO       9:00P.M.
   ⎪
   ⎪ SHINKANSEN  LEAVING TOKYO           4:20P.M.
   ⎪             ARRIVING AT KYOTO       6:50P.M.
   ⎪
   ⎩             LEAVING TOKYO           9:20P.M.
                 ARRIVING AT KYOTO      11:50P.M.

III ⎰ NARITA→KYOTO             ¥ 20,000-

IV ⎧ YEN RATE
   ⎨
   ⎩     $1.00-104YEN

FIG.24

& # x20; 
INFORMATION SERVICE PROVIDING SYSTEM

BACKGROUND OF THE INVENTION

1. Field of the Invention

This invention relates to an information service providing system using a network, and more particularly to a system where a service center searches a plurality of databases in a chain reaction manner for the desired information and provides the retrieved data.

2. Description of the Related Art

Services industries including transportation, finance, and communication are well developed today and information used in these industries is often organized in database form. For example, flight schedules, train schedules, airfare systems, passenger fare systems, etc. have been organized in database form at airlines and railroad companies. Furthermore, deposit systems, exchange rate systems, etc. have also been organized in database form by finance companies. These data items, however, are often organized in database form independently company by company and usage of such databases is often restrictive.

In connection with the use of databases as described above, personal computer communication is well known. In this type of communication system, a communication center connected to personal computer terminals makes contact with the respective companies or service companies having the aforementioned databases to use the databases, and users use the databases via the communication center.

When the above personal computer communication is used to check for the transportation, time, and expenses for a trip (move) from San Francisco to Kyoto (Japan), the processes as described below have been carried out. FIG. 23 is a conceptual diagram of one example. In this case, the user first uses a personal computer 1 to connect to a communication center (not shown) and checks for air routes connecting San Francisco with Japan. When the user wants to go by way of Narita, he or she accesses United Airlines' (UA's) database 2 and Japan Air Lines' (JAL) database 3 which have air routes between San Francisco and Narita. Then, the user reads departure and arrival times and airfares for the route between San Francisco and Narita for each airline as shown in I in FIG. 24.

Next, to find out the time and fare from Narita to Kyoto, the user accesses JR Tokai's database 4 via the personal computer 1 (JR Tokai is a Japanese railroad company). Then, as shown in II in FIG. 24, the user finds out the departure times of Narita Express (transportation from Narita to Tokyo) at Narita and its arrival times at Tokyo. The user further finds out the departure times of the Shinkansen (transportation from Tokyo to Kyoto) at Tokyo and its arrival times at Kyoto. Thereafter, as shown in III in FIG. 24, the user calculates the total fare from Narita to Kyoto on the personal computer 1 and gets a fare of 20,000 yen, for example.

Finally, to exchange the airfares shown in I in FIG. 24 in dollars ($) into those in yen (¥), the user accesses yen-rate database 5 and exchanges the airfares into yen (¥) on the basis of the exchange rate at that time (in the example in IV in FIG. 24, at an exchange rate of 104 yen to the dollar).

From the times (departure times at San Francisco and arrival times at Kyoto) and fares thus obtained, the user, seeing the display on the personal computer 1, determines which airline to use, United Airlines (UA) or Japan Air Lines (JAL).

In the above example, the times and fares for travel by air and rail were found out through personal computer communication. When making use of such services as finance databases and communication databases, the user obtains the necessary data in a similar manner.

As described above, to make use of databases, it has been necessary that the user access the respective databases (in the above example, databases 2 to 5 including the United Airlines' database) one after another, read the necessary data, and then display it. Furthermore, as noted above, it has also been necessary that the read-out data should undergo computation on the personal computer 1. Therefore, it takes time to retrieve and process the necessary information, which makes the conventional system a very inefficient information acquisition system.

SUMMARY OF THE INVENTION

It is accordingly the object of the present invention to overcome the above disadvantages by providing a system which enables desired information to be obtained easily and efficiently in such a manner that just by inputting a particular category and the conditions for the category, an information processing center automatically performs all of the information processes and sends the process results to information terminal devices.

The forgoing object is accomplished by providing a system in which an information processing center, terminals, and a plurality of databases are connected via a communication network, and the information processing center provides the terminals with information service about a plurality of categories, the system comprising: a terminal for specifying one of the categories and requesting information service by specifying the retrieval condition for the desired information; and an information processing center containing: means for selecting the necessary database from the plurality of databases on the specified category; retrieval means for searching databases in a chain reaction manner using a retrieval result as the next retrieval condition so as to fulfill the specified retrieval conditions; and output means for sending the retrieval results of the databases obtained at the retrieval means to the terminal that has made the request.

The foregoing object is also accomplished by providing an information processing device comprising: means for connecting with a plurality of databases via a communication network; means for providing terminals with a guidance to information services about a plurality of categories via a communication network; means for receiving data indicating the category sent from a terminal according to the guidance to information services and retrieval condition data; means for selecting the necessary database from the plurality of databases on the basis of the category specified by the terminal; retrieval means for searching databases in a chain reaction manner using a retrieval result as the next retrieval condition so as to fulfill the retrieval conditions specified by the terminal; and output means for transmitting the retrieval results of the databases obtained at the retrieval means to a particular terminal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 shows the structure of a database of United Airlines (UA);

FIG. 5 shows the structure of a database of Japan Air Lines (JAL);

FIG. 6 shows the structure of a database of JR Tokai;

FIGS. 7A and 7B show the structure of other databases;

FIG. 13 shows the settings for the condition items transmitted to the information processing center;

FIG. 16 shows the processing results in the information processing center with respect to time;

FIG. 17 shows an example of the processing results displayed on the portable terminal unit;

FIG. 20 shows an example of the display appearing in making a reservation via the portable terminal unit;

FIG. 24 is a drawing to help explain a concrete processing state in the conventional information processing system.

DETAILED DESCRIPTION OF THE PREFERRED EMBODIMENTS

Figure 1:
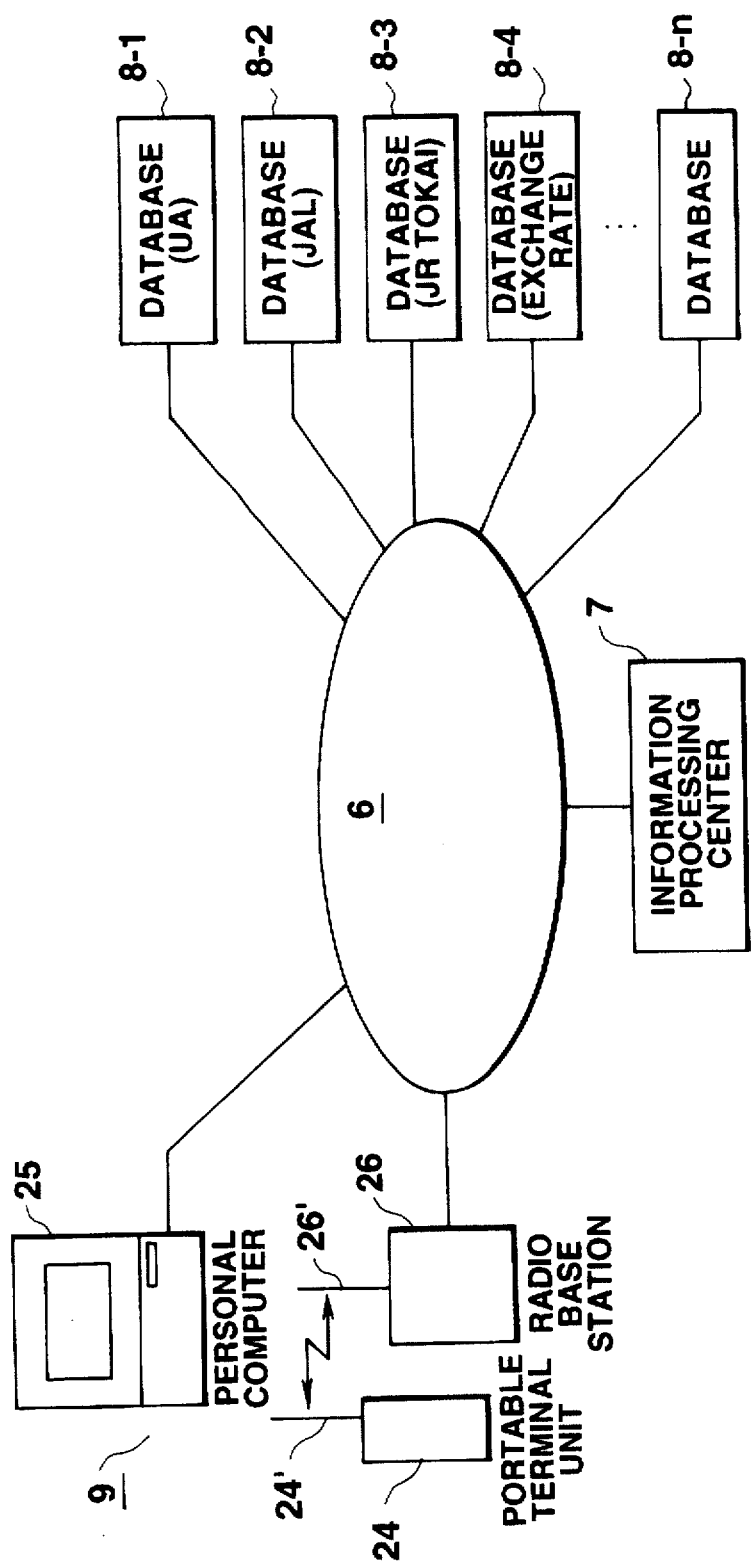
FIG. 1 is a schematic diagram of an information processing system according to an embodiment of the present invention.

FIG. 1 is a schematic diagram of an information service providing system associated with an embodiment of the present invention. In the figure, this system comprises an information processing center 7 connected to an information network 6, databases 8-1 to 8-n, and a terminal unit group 9. The information network 6 may be composed of a dedicated LAN (Local Area Network) or WAN (Wide Area Network) or built up making use of an integrated services digital network (ISDN).

Figure 2:
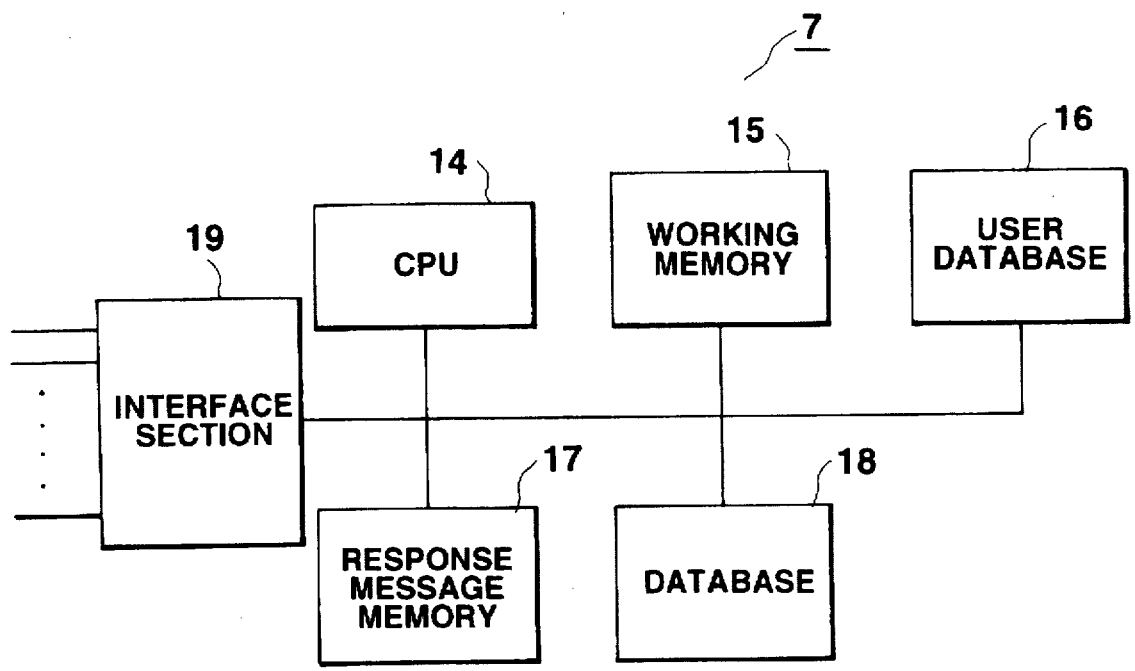
FIG. 2 is a block diagram of the information processing center.

FIG. 2 is a block diagram of the information processing center 7. As shown in the figure, the information processing center 7 comprises a CPU 14, a working memory 15, a user database 16, a response message memory 17, and a database 18, and is connected to the information network 6 via an interface section 19.

The CPU 14 is a central processing unit that controls the entire system of the information processing center 7 according to a system program. This control will be explained in detail later.

The working memory 15 is a memory that is used in the information processing done by the CPU 14 and that stores the data transmitted from the terminal unit group 9 and the data read from the databases 8-1 to 8-n and also temporarily stores the data generated during computation.

Figure 3:
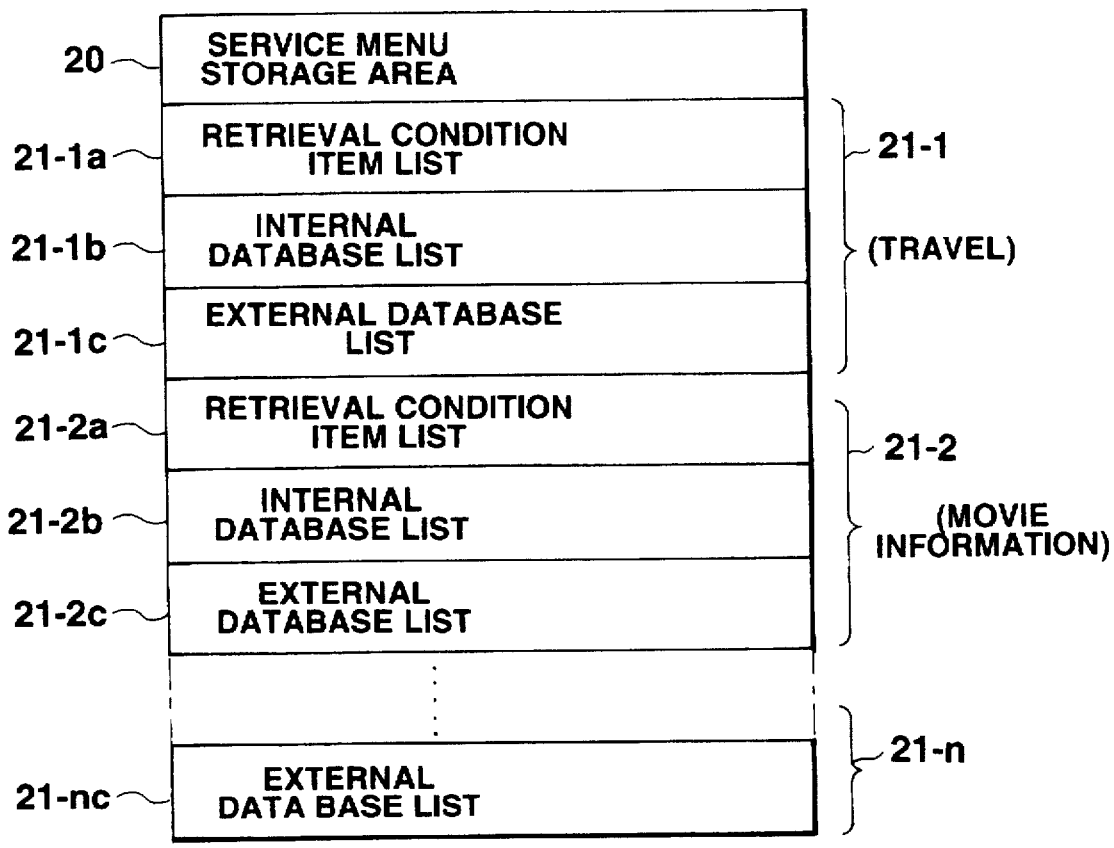
FIG. 3 shows the structure of a database in the information processing center.

The database 18 is a memory that stores the menus of services provided by the information processing center 7, condition item lists, etc. FIG. 3 shows the structure of the database 18. As shown in the figure, the database 18 is made up of a service menu storage area 20 and list storage areas 21-1, 21-2, ..., 21-n corresponding to the individual service menus. In the service menu storage area 20, the types of services offered by the information processing center 7 are stored. In this embodiment, the service menu storage area stores various types of service menus for travel information, movie information, information on events held in each place, weather forecast information, fashion information, information on books and magazines, music information, etc.

In the respective list storage areas 21-1, 21-2, ..., 21-n, the data corresponding to each service is stored as described above. List storage area 21-1 corresponds to travel information, list storage area 21-2 corresponds to movie information, and list storage area 21-3 corresponds to event information.

The list storage areas 21-1, 21-2, ..., 21-n are provided with the retrieval condition item lists 21-1a, 21-2a, ..., internal database lists 21-1b, 21-2b, ..., external database lists 21-1c, 21-2c, ... respectively. The contents of the lists stored in the list storage areas 21-1, 21-2, ..., 21-n differ depending on the contents of the services offered. In the retrieval condition item list for travel service, the necessary items for travel data retrieval including departure place, departure date and time, destination, and arrival date and time have been stored previously. Furthermore, in the retrieval condition item list 21-2a of move information, items including the title of movie and the desired date and time of seeing movies are stored, for example.

The lists stored in the internal database lists 21-1b, 21-2b, ... and the external database lists 21-1c, 21-2c, ... differ depending on the service. In the internal database list 21-1b for travel service, a retrieval list for the travel database is stored. For instance, information on the air routes offered by airlines and the routes offered by railroad companies are stored. Furthermore, the list of the databases containing travel information on airlines, railroads, bus routes, hotels, etc. in databases 8-1 to 8-n connected to the information network 6 is stored in the external database list 21-1c.

In the user database 16 provided in the information processing center 7 shown FIG. 2, the owner of the information terminal unit 9 is entered. In the response message memory 17, preset various types of response messages are stored. For example, messages such as "The transmission of service menu is completed", "A missing item is present", "The processing result will be transmitted" are stored as response messages.

The databases 8-1 to 8-n are connected to the information processing center 7 via the information network 6 as described earlier. The databases connected to the information network 6 contain a wide range of service data including data on service businesses such as transportation, finance, and communication, data on yen rate and stock, and data on companies.

In the embodiment, in the explanation below, the database 8-1 is a database that stores the data on the United Airlines' (UA') air routes, flight times, fares, etc. The database 8-2 is a database that stores the data on the Japan Air Lines' (JAL') air routes, flight times, fares, etc. Furthermore, database 8-3 is a database that stores the data on the JR Tokai's time table, fares, etc. The database 8-1 is a database that stores exchange rates.

FIG. 4 is a drawing to help explain the data structure of database 8-1 for United Airlines (UA). In the database 8-1, for example, the air routes between San Francisco (SFC) and Narita (NRT), San Francisco (SFC) and Honolulu (HNL), San Francisco (SFC) and New York (NYK) are stored. As time data, for example, information about a fight from San Francisco (SFC) to Narita (NRT) leaving 2:30 p.m. every day and arriving at 6:30 p.m. is stored. In addition, the fare for the flight (600$) is also stored.

Similarly, FIG. 5 shows a database of Japan Air Lines's air routes, flight times, and fares.

FIG. 6 shows a database for JR Tokai's time table, service times, and fares. As described above, the departure times and arrival times, together with the routes, for example, from Narita to Kyoto and from Tokyo to Matsumoto, are stored. In addition, the fares are also stored.

Although the yen-rate database 8-4 is not shown concretely, the exchange rates of, for example, yen (¥) to the dollar ($) or yen (¥) to the mark (DM) updated at regular intervals of time are stored. In addition to the above databases 8-1 to 8-4, to the information network 6, the databases of other means of transportation such as American Airlines (AA) and Western Buses are also connected as shown in FIGS. 7A and 7B.

Configuration of Terminal Unit

The terminal unit 9 contains a portable terminal unit 24 with a radio function and a personal computer 25 as shown in FIG. 1. The personal computer 25 is connected to the information network 6 via, for example, a public telephone line or a special line. The portable terminal unit 24 is connected to the information network 6 by radio via a radio base station 26. In order to sense the calling from the portable terminal unit 24 in a narrow sphere (e.g., with a radius of about 200 m), the radio base station 26 is installed on, for example, a telephone pole, a public telephone box, or the wall of a building.

Figure 8:
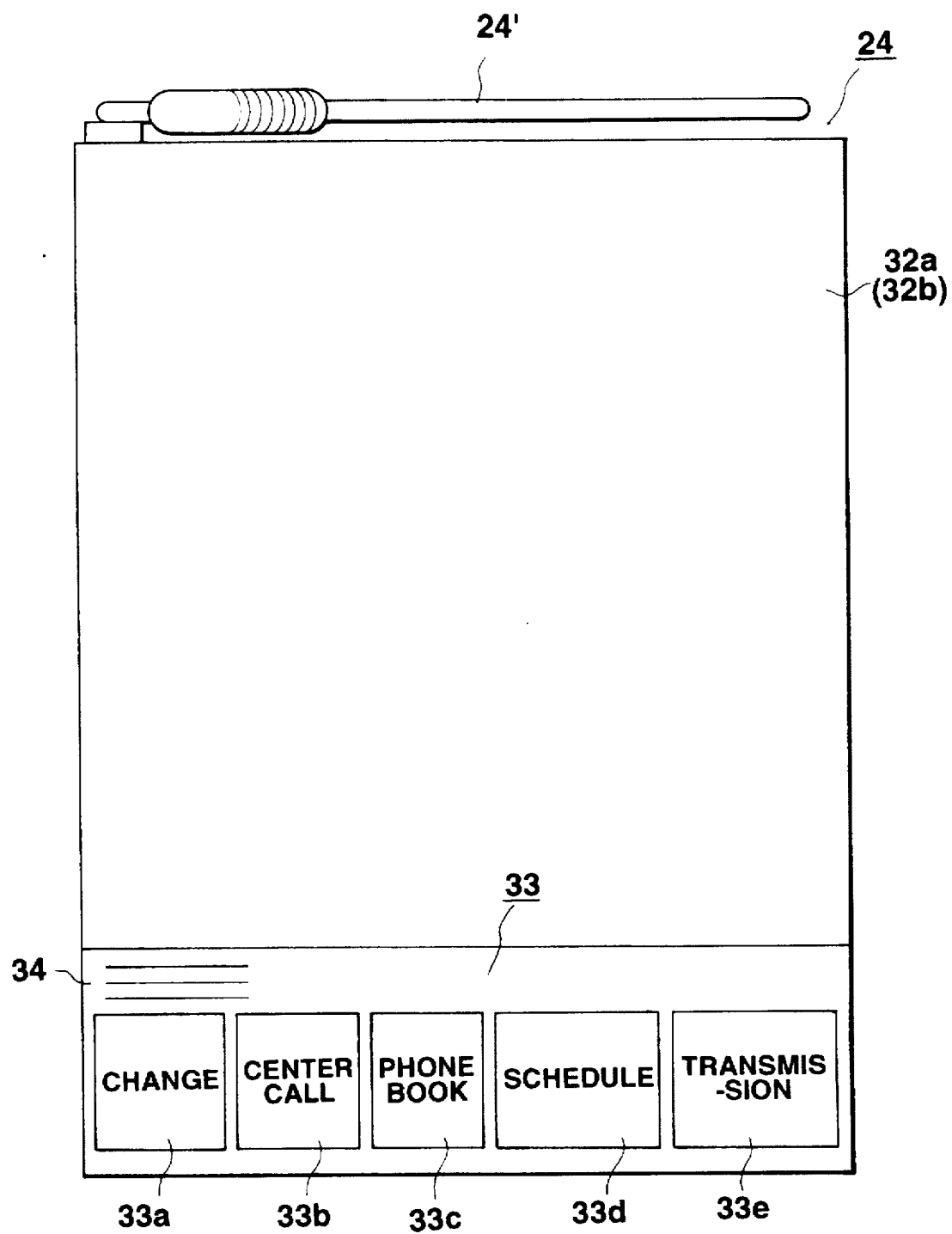
FIG. 8 is an overall view of a portable terminal unit.
Figure 9:
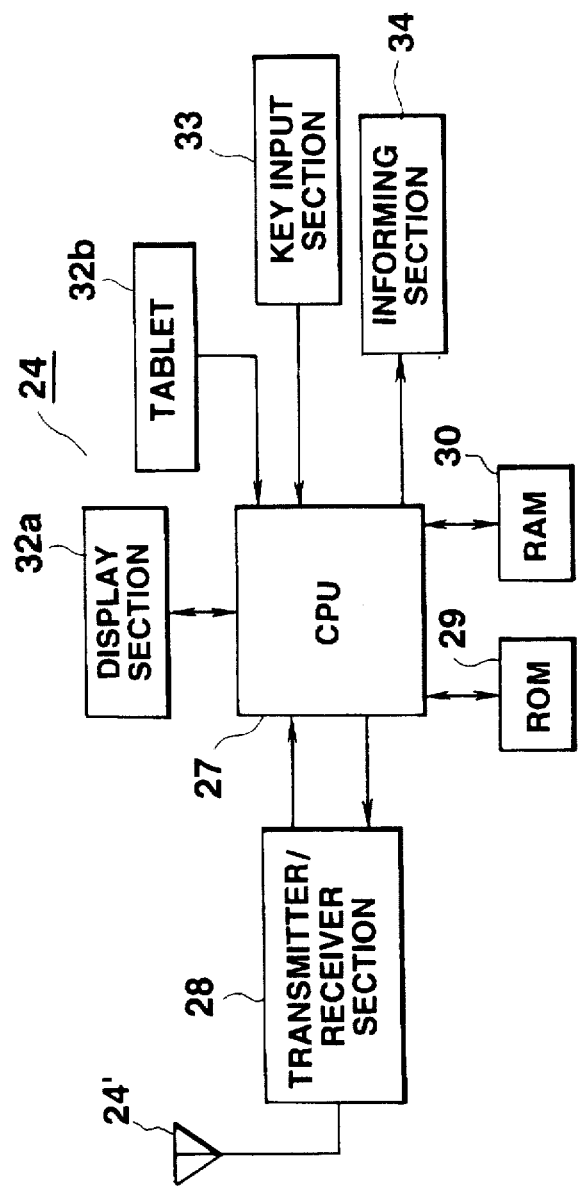
FIG. 9 is a block diagram of the portable terminal unit.

FIGS. 8 and 9 are explanatory diagrams for the potable terminal unit 24. FIG. 8 shows an outward appearance of the portable terminal unit 24, and FIG. 9 is a block diagram of the portable terminal unit. The portable terminal unit 24 is a portable information terminal that provides two-way radio transmission and comprises a CPU 27, a transmitter/receiver section 28, a ROM 29, a RAM 30, a display section 32a, a tablet 32b, a key input section 33, an informing section 34. The CPU 27 is a central control section that controls the portable terminal unit 24. The ROM 29 stores a program that controls data transmission and reception of the portable terminal unit 24. According to the program stored in the ROM 29, the CPU 27 carries out a data transmission and reception process explained later, a display process of service menus, a display process of condition item lists, etc.

The transmitter/receiver section 28 is a circuit that detects, amplifies, and demodulates the signal received at an antenna 24' and converts the demodulated signal into digital data consisting of 0s and 1s. The converted digital data is outputted to the CPU 27. The transmission data from the portable terminal unit 24 is sent to the radio base station 26 via the transmitter/receiver section 28 and the antenna 24'. The RAM 30 temporarily stores the data from the information processing center 7 as well as the data generated during the processing at the CPU 27.

The display section 32a is composed of a dot-matrix liquid-crystal element. On the display section 32a, a tablet 32b is provided. The tablet 32b is of the pressure-sensitive type or the electromagnetic induction type and allows characters and diagrams to be written on it using a pen. On the display section 32a, the service menus and condition item lists sent from the information processing center 7 are displayed. The condition setting can be done by pointing the pen at the desired item on the tablet 32b on the display section 32a and thereby specifying the desired service and by writing "Departure Place", "Departure Time", etc. in the condition item list.

The key input section 33 is provided in the lower part of the portable terminal unit 24 and comprises a change key 33a, a center call key 33b, a telephone directory key 33c, a schedule key 33d, and a transmission key 33e. The change key 33a is used to change the functions of the portable terminal unit 24. The center call key 33b is used to call the information processing center 7. The transmission key 33e is used to output the selected category and conditions to the information processing center 7. The telephone book or directory key 33c is used to designate a telephone directory function. The schedule key 33d is used to use a schedule function. Therefore, the portable terminal unit 24 of the embodiment can also be used as a telephone directory or a scheduler.

The informing section 34 is composed of a speaker and, when the message from the information processing center 7 is received, sounds the message under the control of the CPU 27.

The personal computer 25 acting as the terminal unit 9 is connected to the information network 6 as shown in FIG. 1 via a public telephone line and can exchange data with the information processing center 7. Therefore, in the personal computer 25, a particular OS (operating system) that can connect with the information processing center 7 and exchange data is incorporated. On the display of the personal computer 25, the above service menus and condition item lists appear. From the keyboard, the desired service menu or condition can be specified or set. The service menu and condition thus specified or set are sent to the information processing center 7.

Operation of System

Hereinafter, the operation of the system will be described. The processing in this embodiment requires (A) a category/condition setting process where service menus (categories) and condition items are set on the portable terminal unit 24 and (B) a retrieval/transmission process where a database is selected at the information processing center 7 and the result processed on the basis of the selected data is transmitted to the portable terminal unit 24. These two processes will be explained separately.

Category/Condition Setting Process (A)

Figure 10:
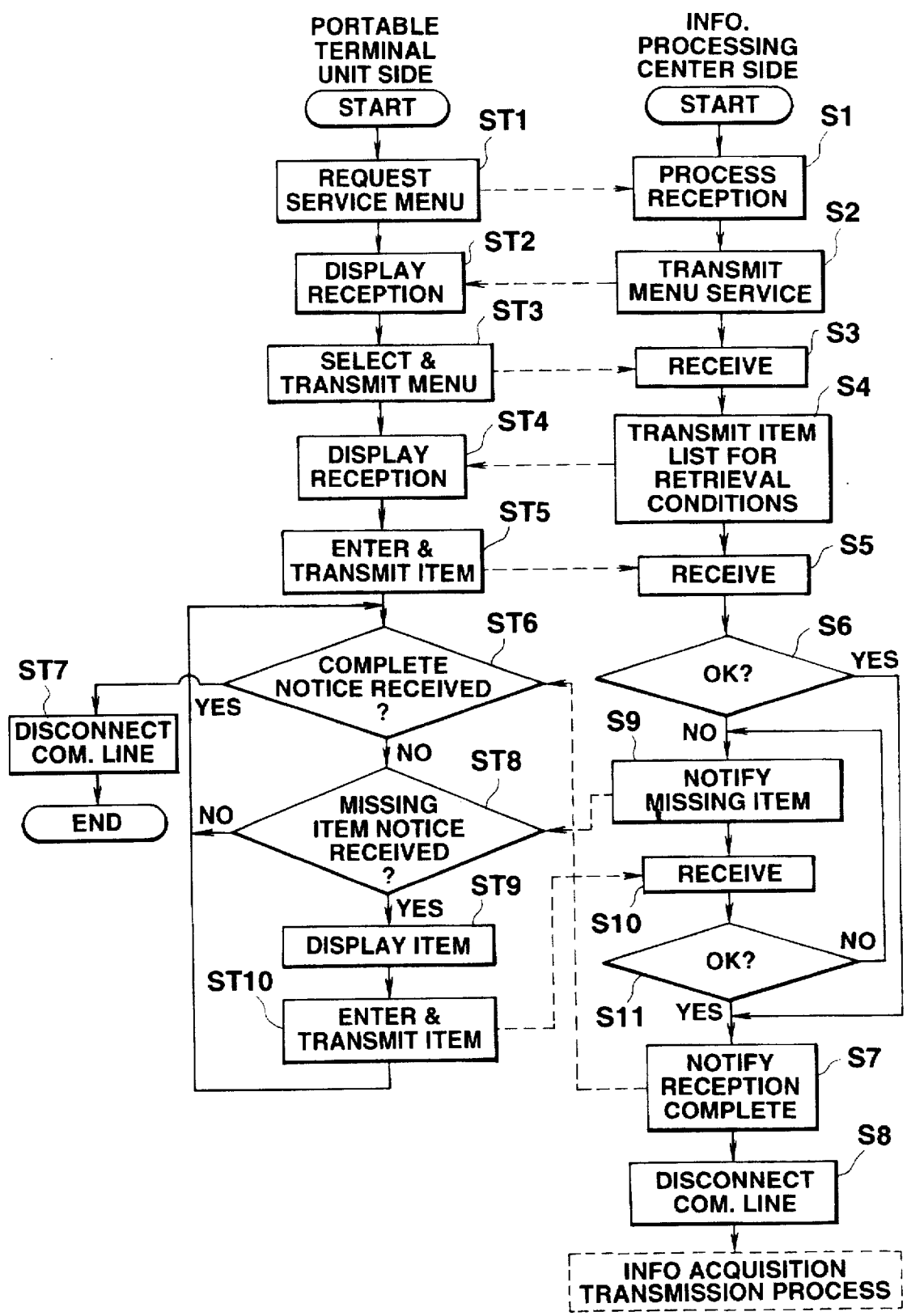
FIG. 10 is a flowchart to help explain a category and condition setting process (process A) in the information processing system.

FIG. 10 is a flowchart to help explain this process. In the figure, the processing flow at left shows the process on the side of the portable terminal unit 24 and the processing flow at right shows the process on the side of the information processing center 7.

First, when the owner of the portable terminal unit 24 wants to get service from the information processing center 7, he or she operates the portable terminal unit 24 to request a service menu (ST1). In this embodiment, it is assumed that the owner is going to get information service about an itinerary and expenses for a trip from San Francisco to Kyoto.

When the center call key 33b on the portable terminal unit 24 is pressed with a finger or a pen, the specifying signal is outputted to the CPU 27. The CPU 27 reads from the ROM 29 the specifying code indicating a service menu request and the user code indicating the owner of the unit. The transmitter/receiver section 28 performs a modulation process that modulates a sub-carrier in accordance to the data and transmits it via the antenna 24' by radio. Receiving the transmission, the radio base station 26 demodulates the received signal and sends the demodulated data to the information processing center 7 via the information network 6.

When the data is inputted into the CPU 14 via the interface section 19, the information processing center 7 performs a reception process (S1). The reception process writes the inputted user code into the working memory 15, compares the code with the user code previously entered in the user database 16, and then judges whether or not it is a request from the particular user. After judging that it is a service menu request on the basis of the specifying code, the CPU 14 searches the database 18, and reads the service menu (a service menu data list) from the service menu storage area 20. Then, the CPU 14 transmits the read-out service menu to the user who has made a request via the interface section 19, information network 6, and radio base station 26 (S2).

Figure 11:
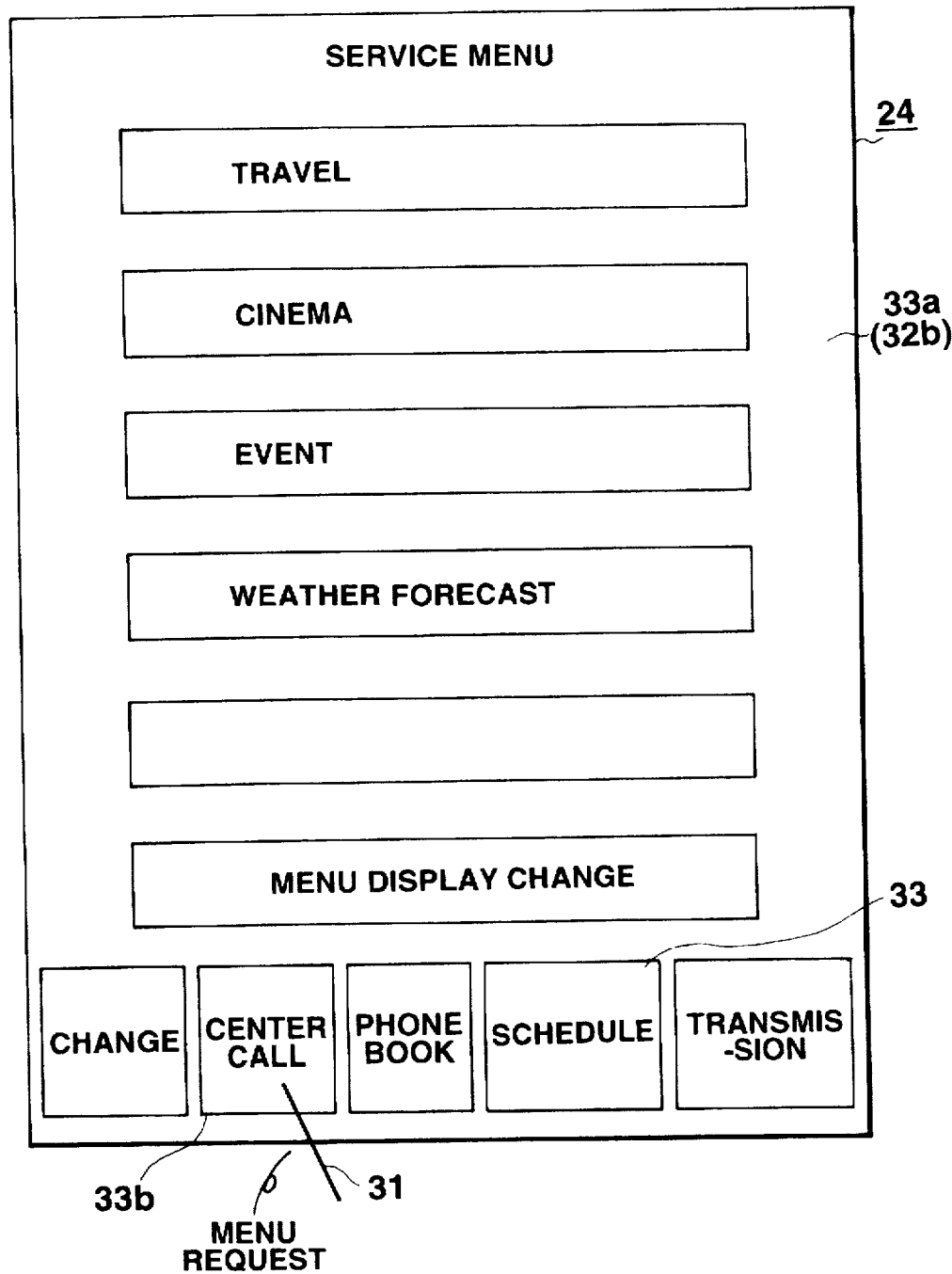
FIG. 11 shows a service menu displayed on the portable terminal unit.

In the portable terminal unit 24, when the antenna 24' receives the service menu, the transmitter/receiver section 28 demodulates the data and outputs the demodulated data to the CPU 27. The CPU 27 displays the inputted service menu on the display section 32a (ST2) to inform the user of the contents of services offered by the information processing center 7. FIG. 11 shows the displaying state of the portable terminal unit 24 at that time.

As shown in the figure, when the service menu appears, the user selects the desired menu (ST3). Since the user wants to get service about an itinerary and expenses for a trip from San Francisco to Kyoto, he or she will select "Travel" as a menu (category). The category data on the selected "Travel" is sent from the CPU 27 to the radio base station 26 via the transmitter/receiver section 28 (ST3).

When the information processing center 7 receives the category data "Travel" (S3), the CPU 14 transmits a retrieval condition item list on the basis of the category "Travel" (S4). In this case, because "Travel" has been selected, information on the retrieval condition item list 21-1a is transmitted to the portable terminal unit 24 (S4).

Figure 12:
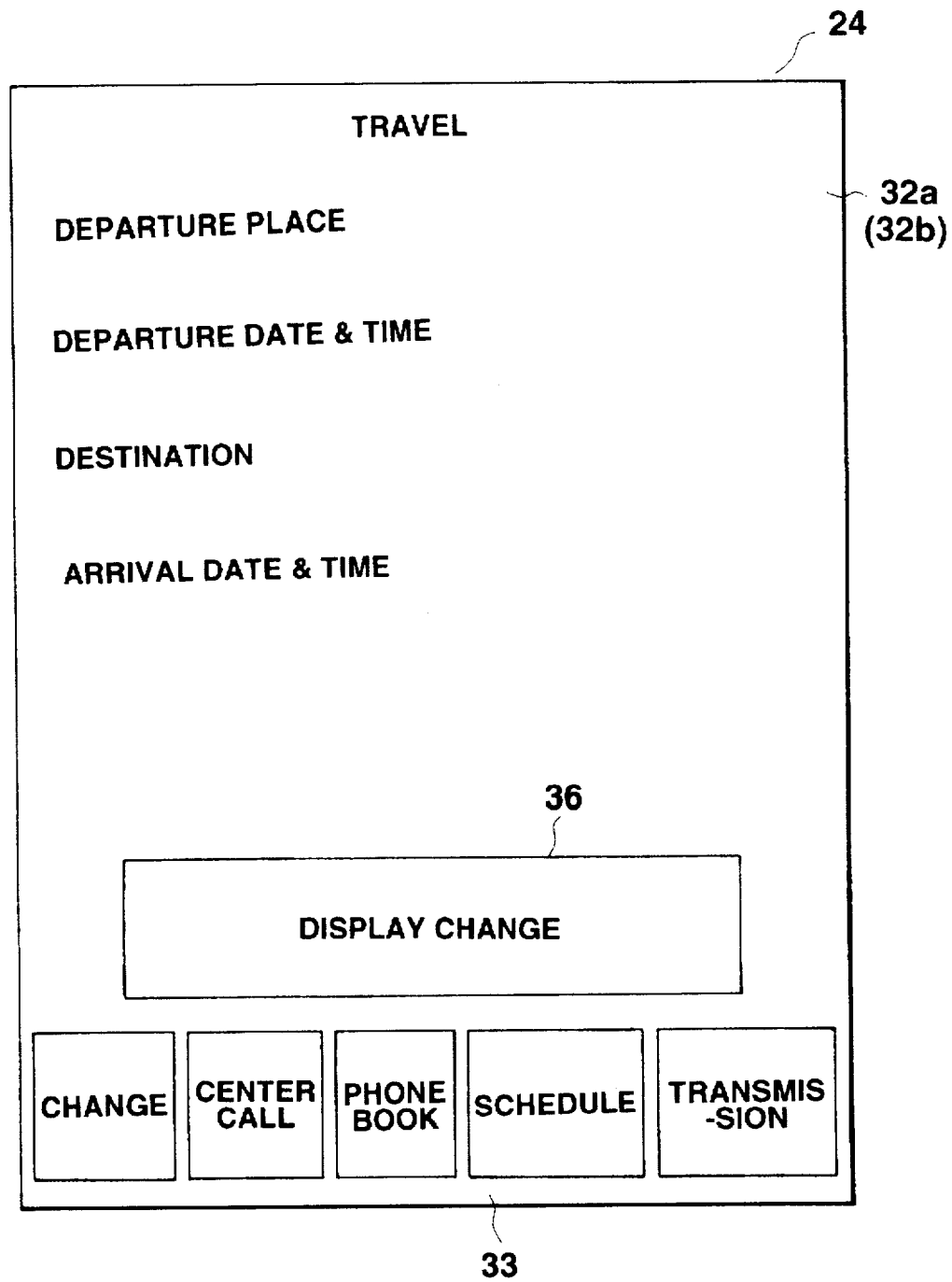
FIG. 12 shows condition items displayed on the portable terminal unit.

Receiving the retrieval condition item list, the portable terminal unit 24 displays the retrieval condition item list on the display section 32a (ST4). FIG. 12 shows the displaying state of the portable terminal unit 24 at that time. Looking at the retrieval condition list, the user enters retrieval conditions (ST5). In the case of service related to "Travel", the retrieval conditions include "Departure Place", "Departure Date and Time", "Destination", and "Arrival Date and Time". In the figure, an screen change icon 36 is also displayed. When more condition items are present, the condition items on the next and later pages can be displayed by specifying the icon with a pen 31. The condition items set on the next and later pages include, for example, air route options, airline options, and first class or economy class options.

In this embodiment, "San Francisco" is inputted into the item "Departure Place" using the pen 31, and "Kyoto" is inputted into the item "Arrival Place". If, for example, departure at 7:30 p.m. on Monday is desired, "June 27 (Monday), 2:30 p.m." is inputted in the item "Departure Time". If a particular arrival time is desired, the time is inputted. The condition item data thus inputted is transmitted to the information processing center 7 (ST5).

Receiving the above-described retrieval condition data (S5), the information processing center 7 judges whether or not the received retrieval conditions have any omission (S6). FIG. 13 shows the contents of the retrieval conditions. The CPU 27 judges whether or not all of the retrieval conditions for the principal items shown in the figure have been specified and thereby judges whether or not there is any missing item for the retrieval conditions. If there is no missing item for the retrieval conditions, a service reception complete notice will be transmitted to the portable terminal unit 24 (S7), and the communication line between the portable terminal unit 24 and the information processing center 7 will be disconnected (S8).

If there is a missing item for the retrieval conditions, the missing item for the retrieval conditions is notified to the portable terminal unit 24 (S9). At this time, after transmitting the above condition item (ST5), the portable terminal unit 24 judges whether or not a reception complete notice has arrived from the information processing center 7 (ST6). When receiving the reception complete notice, the portable terminal unit 24 also disconnects the communication line (ST7). If any reception complete notice has not arrived and instead a missing item notice has arrived from the information processing center 7, the item will be displayed on the display section 32a on the portable terminal unit 24 (ST9). For example, if the retrieval condition for the item "Arrival Place", one of the chief items in the above example, has not been specified, a missing item notice will be sent from the information processing center 7 to give instructions to enter the retrieval condition into the missing item (item specification) (ST8, ST9). When there is any missing item, the message "There is a missing item" transmitted from the information processing center 7 is sounded at the informing section 34, and therefore the user can know the situation easily.

After making sure of the contents of the missing item displayed on the portable terminal unit 24 in the above example, the user enters "Kyoto" in the item "Arrival Place". The missing item data thus entered is sent to the information processing center 7. If this completes all of the retrieval conditions, a reception complete notice will be sent to the portable terminal unit 24 and the communication line is disconnected (S7, S8). After receiving the reception complete notice, the portable terminal unit 24 also disconnects the communication line (ST7).

Retrieval/Transmission Process (B)

Figure 14:
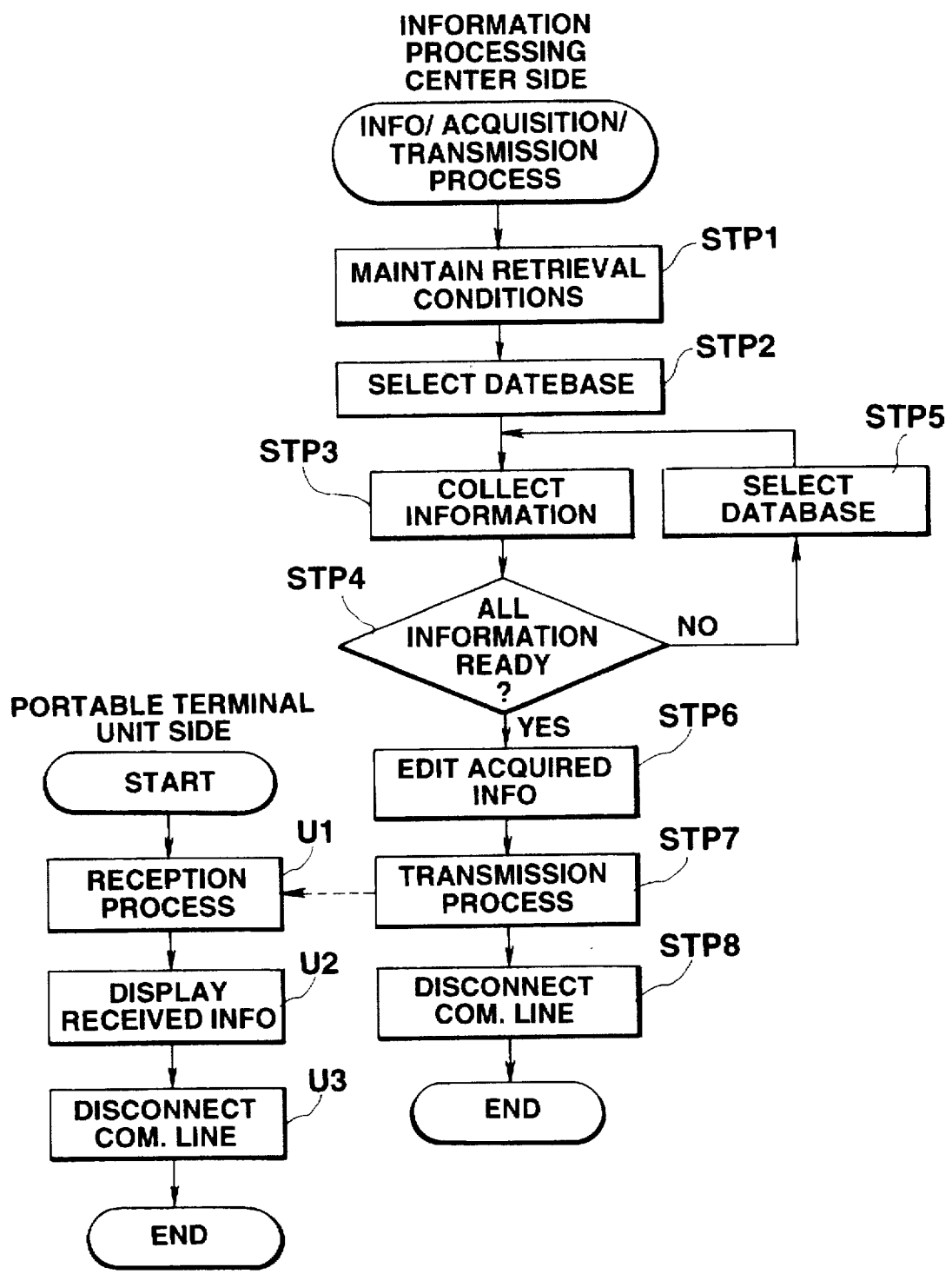
FIG. 14 is a flowchart to help explain a retrieval and transmission process (process B) in the information processing center.

When all of the retrieval conditions for the category "Travel" are complete, the information processing center 7 executes the retrieval/transmission process according to the flowchart of FIG. 14. First, the CPU 14 maintains the retrieval conditions (STP1). The maintenance of the retrieval conditions is effected to check whether or not the items for the above retrieval conditions have any omission and make sure of the connection of the information network 6.

Next, the information processing center 7 searches the external database list 21-1C (see FIG. 3) of the database 18 and selects a database to be used from the category "Travel" (STP2). The database selected at this time is, for example, a database of an airline or a railroad company (e.g., United Airlines' (UA's) database 8-1, Japan Air Lines (JAL's) database 8-2, or JR Tokai's database 8-3), a hotel database, a tourist information database, or an exchange rate database (database 8-4).

Then, using the above database, the user, according to the above conditions, collects the information about transportation means and expenses for a trip from San Francisco to Kyoto that he or she needs. The flow is executed by repeating the processes and judgments in STP3 to STP5 of FIG. 14. Specifically, the CPU 14 reads the conditions specified in the retrieval condition item list 21-1a in the database 18 (collects information) (STP3), judges whether or not all of the information is ready, and then selects and reads the necessary data from the database selected in the aforementioned process (STP2) (STP4, STP5). The above-described processes are repeated until the service that the user has required is completed (edited) (STEP3 to STEP5). Hereinafter, a concrete explanation will be given.

Figure 15:
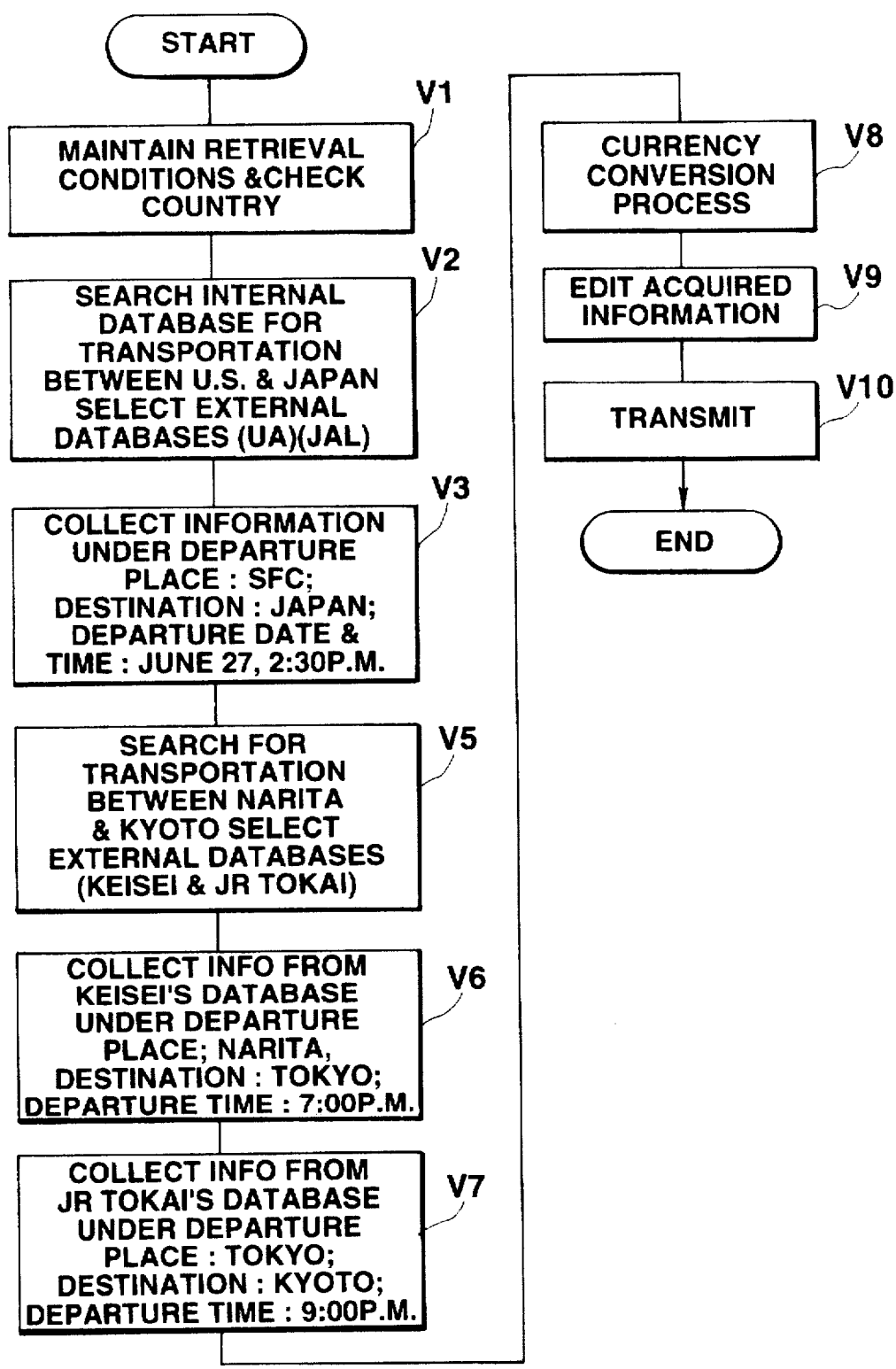
FIG. 15 is a flowchart to help explain the retrieval and transmission process (process B) in detail in the information processing center.

FIG. 15 is a flowchart to help explain the above processes and judgments (STP3 to STP5) using the category "Travel" as an example. First, the retrieval conditions are maintained and the country is checked (V1). The process (V1) corresponds to the information acquisition process (STP3) shown in FIG. 14. More specifically, what is collected are the following pieces of information specified in the retrieval condition item list 21-1a previously read from the CPU 14: "Departure Place", "Departure Time", and "Destination". Then, on the basis of the above information, a database is selected and the necessary information is read (V2). From Departure Place: "San Francisco" and Arrival Place: "Kyoto", it can be seen that data on transportation between different countries is necessary. Here, because the U.S. and Japan are considered in the example, the databases 8-1 and 8-2 of United Airlines (UA) and Japan Air Lines (JAL) which have air routes between the U.S. and Japan are selected. The fact that the two airlines have air routes between the U.S. and Japan can be known by searching the internal database 21-1b stored in the database 18.

Next, from the condition of "June 27, 2:30 p.m.", the corresponding flights are selected from the databases 8-1 and 8-2 of the two airlines. Here, in the case of United Airlines (UA), the flight whose departure time at San Francisco is 2:30 p.m. and whose arrival time at Narita is 6:30 p.m. is read from FIG. 4. At the same time, a fare of 600 dollars for the flight is also read (V3). Although not shown, the CPU 14 searches for flights of Japan Air Lines (JAL) on the basis of the information shown in FIG. 5. Because the flight leaving for Narita is 9:30 a.m., it does not meet the conditions required by the user, and then the data is not read. The process (V2) corresponds to the process (STP5) of FIG. 14.

The data thus read is used to check for the transportation means, time, and expenses for "Travel" that the user wants, and also used to select a database to be searched next.

Specifically, if the user takes a flight of United Airlines (UA), he or she will arrive at "Narita". Therefore, in the case of using United Airlines (UA), to travel to Kyoto, Narita is the condition for the next "Departure Place". The next route to Kyoto is Narita to Kyoto. The time that the United Airlines (UA) flight arrives at Narita is 6:30 p.m. The arrival time is the condition for "Departure Time" of a transportation means used next from Narita. Namely, the CPU 14 sets the selecting conditions for a database to be selected next on the basis of the information read from the preceding process. The process corresponds to the process (STP3) shown in FIG. 14.

Then, on the basis of the above conditions, the information processing center 7 selects the next database. The database selected at this time is retrieved from the database searched on the basis of the category "Travel". By doing this, the time required to search the database can be shortened. Concretely, as the database searched at this time under the condition of departure from "Narita", the database of JR Tokai (database 8-3) or that of Keisei Electric Railway is searched (V5).

Then, the Keisei Electric Railway's database is searched and the train whose departure time is equal or closest to Departure Time: 6:30 p.m. or later is selected. If there is a train leaving Narita at 7:30 p.m. for Tokyo, it will be selected (V6). At the same time, data on the fare from "Narita" to "Tokyo" is also read out.

The data thus read is used to select the database to be searched next as described above. Specifically, if the 7:30 p.m. up train from Narita to Tokyo (Narita EX No. 8 is selected, the time that the train arrives at Tokyo can be known. The time is determined to be the Departure Time condition for searching the next database. As for Departure Place, "Tokyo" is determined to be the condition for the next Departure place.

The database is searched according to the conditions, and the JR Tokai's database 8-3 is selected and further a JR Tokai train whose departure time is at 8:30 p.m. or later is selected on the basis of the time that the above train arrives at Tokyo (V7). On the basis of these, a Shinkansen train leaving for or passing Kyoto at 8:30 p.m. or later is selected, and its arrival time at Kyoto can be known. At the same time, the fare from Tokyo to Kyoto is read out.

After the route and time from "San Francisco" to "Kyoto" have been set as described above, the total expenses are calculated. As described earlier, this process determines a database to be selected on the basis of the information on the process executed previously. In the above process, 600 dollars ($) are read out as airfare and, 1,000 yen and 20,000 yen (¥) are read out as the fares for the Keisei Electric Railway and the JR Tokai, respectively. Therefore, to compute the expenses, use of exchange rate database 8-4 is indispensable. Specifically, if the symbols or codes for dollars ($) and yen (¥) have been read in the preceding process, exchange rate database 8-4 is selected on the basis of these symbols or codes. Then, according to the database 8-4 read out, yen (¥) is converted into dollars ($) or dollars ($) is converted into yen (¥) (V8). Concretely, when United Airlines (UA) is used, 1,000 yen is changed into 179.52 dollars ($), and 20,000 yen is changed into 190.48 dollars. These dollars are added to the aforementioned airfare of 600 dollars, giving a total of 800 dollars ($).

Therefore, the time and expenses from San Francisco to Kyoto have been calculated in the case of using United Airlines (UA).

After all of the processes have been completed as described above, it is judged that all of the information is ready (YES at STP4 in FIG. 14), followed by an editing process of the information thus obtained (STEP6, V9). FIG. 16 shows what is obtained by editing the information thus obtained and arranging it with respect to time. Here, m1 to m16 in the figure indicate time series.

Then, the data thus edited is transmitted to the portable terminal unit 24 under the control of the CPU 14 (STP7, V10). After the transmission process has been completed, the information processing center 7 disconnects the communication line (STP8). The edited information outputted from the information processing center 7 is received by the portable terminal unit 24 (U1). The CPU 27 displays the received editing result on the display section 32a (U2) and disconnects the communication line (U3). FIG. 17 shows the display state at that time. The fact that the process at the information processing center 7 has been completed can be known easily from the message "Information processing has been completed" transmitted from the information processing center 7.

In the display state of FIG. 17 showing the processing results at the information processing center 7, all of the processing results are shown on one page. When all of the data cannot be displayed on one page, a continuation icon 35 may be allowed to appear and the remaining processing results be displayed on the second and later pages.

Second Embodiment of the Present Invention

While in the above embodiment, only the processing result displayed on the display section 32a of the portable terminal unit 24 is known, the unit may be constructed so that a reservation can be made on the basis of the processing result.

Figure 19:
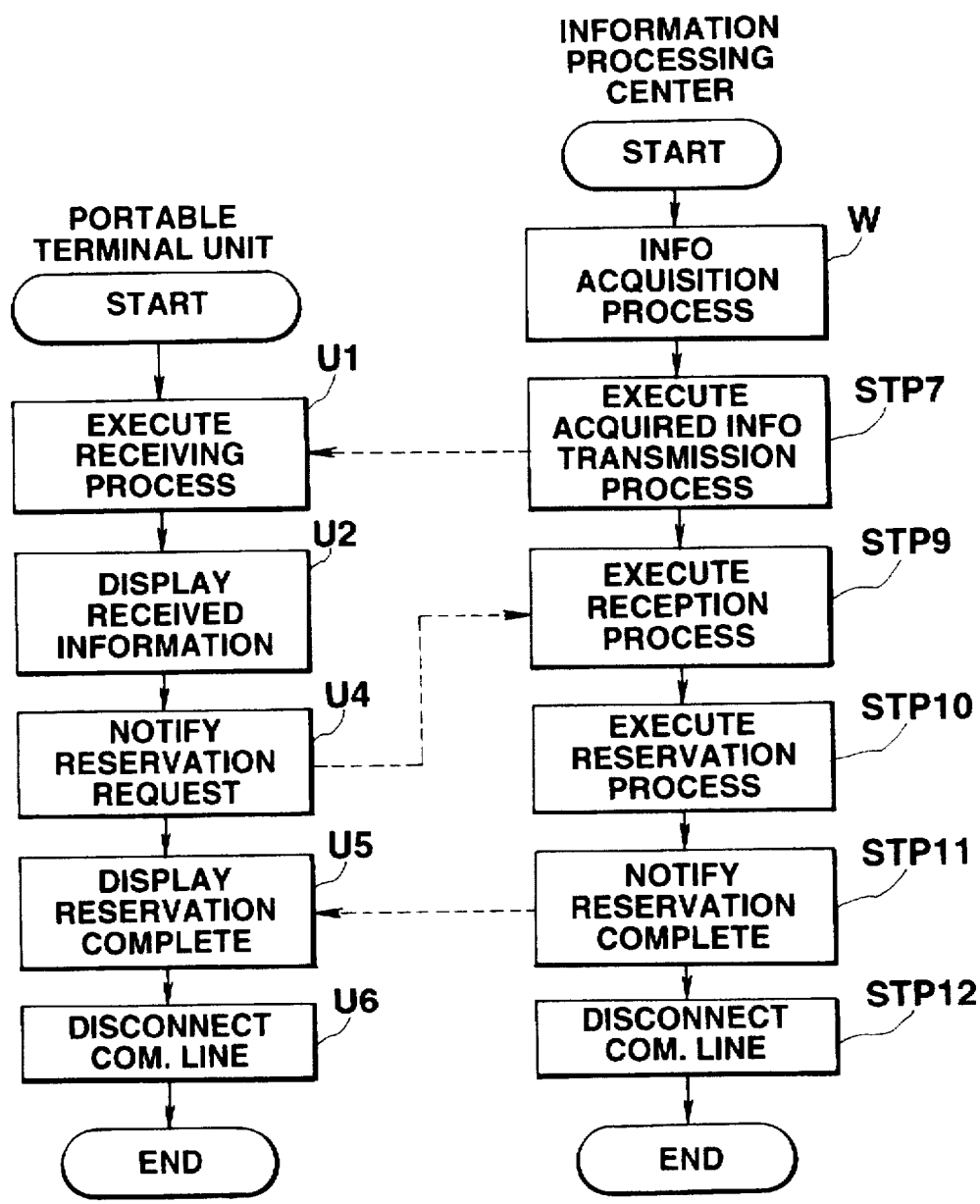
FIG. 19 is a flowchart for making a reservation via the portable terminal unit.

FIG. 19 is a flowchart to help explain the process for this case. In the figure, the information acquisition process (step W) includes the processes at STP1 to STP6 in the retrieval/transmission process (process B in the previous embodiment) shown in FIG. 14. In the previous embodiment, it corresponds to the process of collecting the information about the time (itinerary) and fare for travel from San Francisco to Kyoto. The processing result thus obtained at the information processing center 7 is transmitted to the portable terminal unit 24 as described above (STP7). The portable terminal unit 24 receives and displays it (U1, U2).

Figure 18:
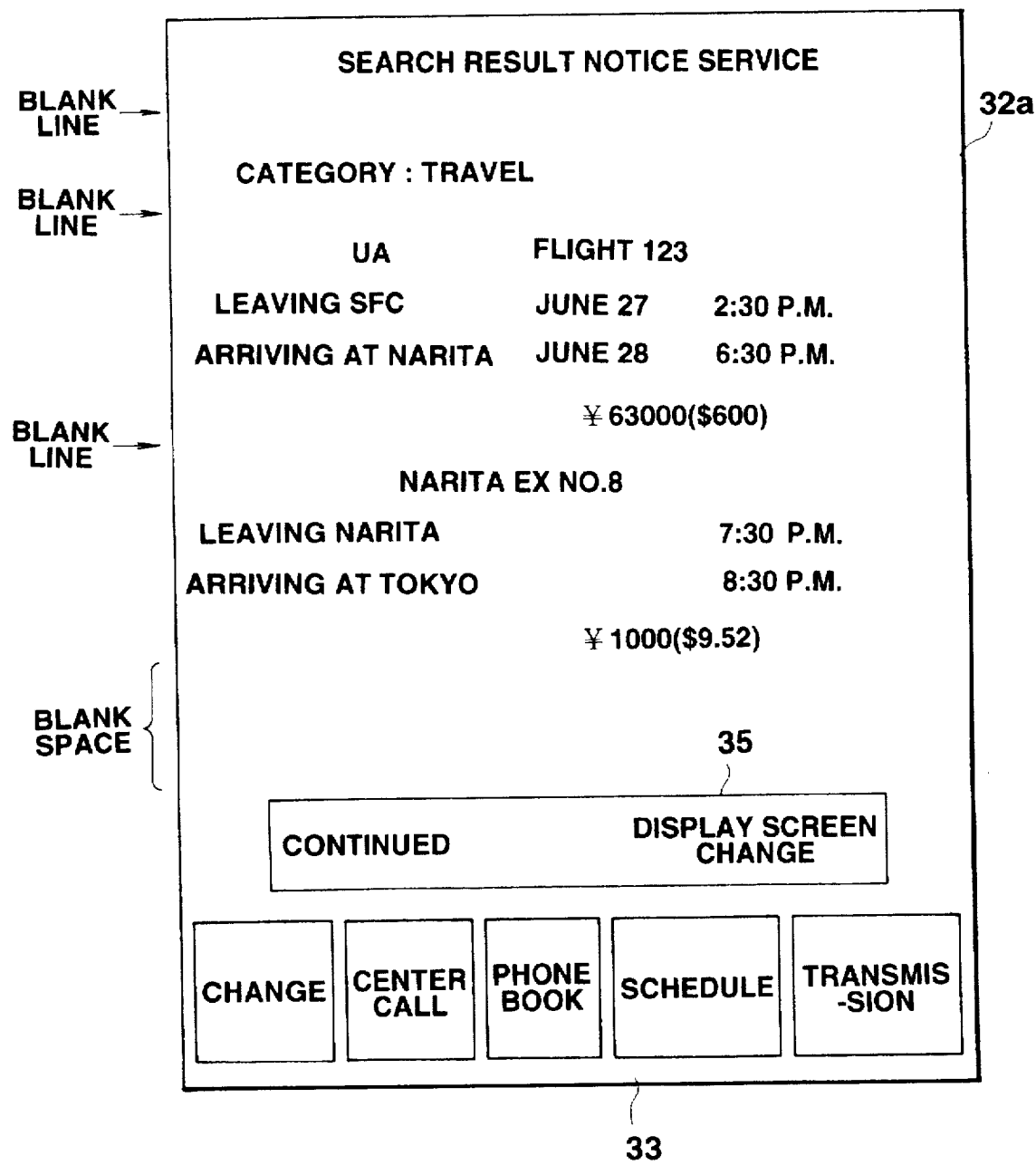
FIG. 18 shows another example of the processing results displayed on the portable terminal unit.

In this case, the display state on the display section 32a differs from FIGS. 17 and 18 and is as shown in FIG. 20. Specifically, at the end of the processing result, a choice display of "Reserve" and "Cancel" appears. The user makes sure of this display and, when going to travel according to the displayed itinerary, can reserve the necessary airline ticket and Shinkansen ticket. Therefore, when the user wants the above reservations, he or she can reserve the airline ticket and Shinkansen ticket by touching the display "Reserve" with a pen. In this case, the portable terminal unit 24 transmits a reservation request notice to the information processing center 7 (U4). When receiving the notice, the information processing center 7 performs a reservation process of relevant tickets (STP9, STP10). Then, the center transmits a reservation complete notice to the portable terminal unit 24 and disconnects the communication line (STP11, STP12). On the other hand, the portable terminal unit 24, receiving the reservation complete notice, displays the corresponding message and disconnects the communication line (U5, U6).

By the above processing, the user can not only know the time (itinerary) and expenses for the travel easily, but also make the reservations easily and very efficiently. The information processing center 7 may perform the ticket reservation by accessing each database via the information network 6 and making reservations at the companies or service agents that manage the respective databases, or by reserving the tickets at the airlines and railroad companies by mail.

Third Embodiment of the Present Invention

Figure 21:
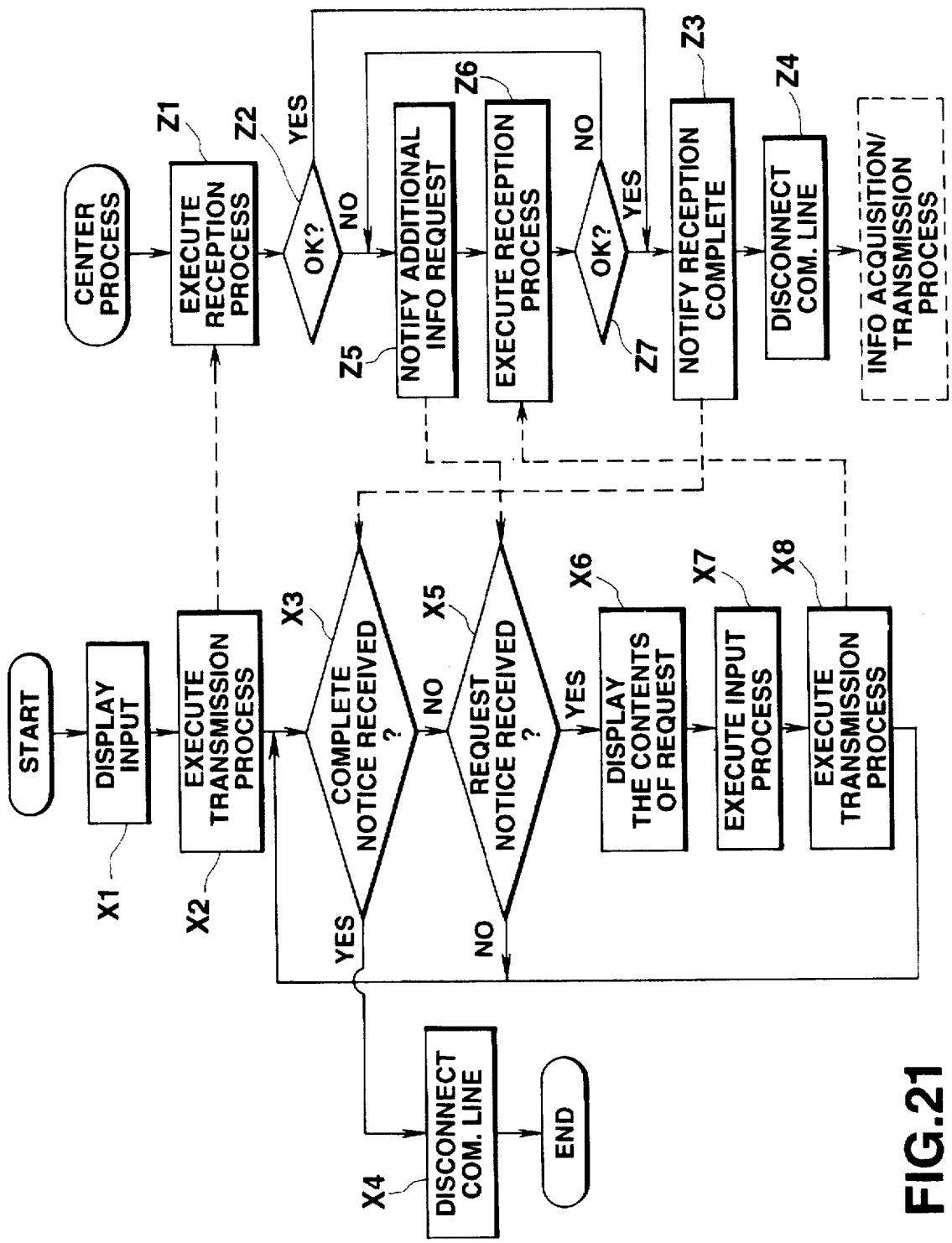
FIG. 21 is a flowchart to help explain a category and condition setting process (process A) in the information processing system.

While in the above embodiments, the portable terminal unit 24 has neither service menus nor condition item lists, and uses the data stored in the database 18 in the information processing center 7, the portable terminal unit 24 may be constructed so as to have the data. FIG. 21 is a flowchart to help explain the data exchange between the information processing center 7 and the portable terminal unit 24 thus constructed. In the figure, because the service menus and condition item lists have been entered in the portable terminal unit 24, the user displays the data on the display section 32a, specifies a menu (category) and enters the corresponding condition items (X1). Then, data on the menu (category) and condition items is transmitted to the information processing center 7 (X2). When receiving the data (Y1), the information processing center 7 judges whether or not the condition items for all of the entered data are included (Z2). The processes that follow are the same as those in FIG. 10. Specifically, if there is no missing item in the retrieval conditions (YES at Z2), a service reception complete notice will be transmitted to the portable terminal unit 24 (Z3) and the communication line is disconnected (Z4). When receiving the reception complete notice from the information processing center 7, the portable terminal unit 24 side also disconnects the communication line (X3, X4).

When the retrieval conditions have any missing item (NO at Z2), the missing item for the retrieval conditions is notified to the portable terminal unit 24 (Z5). When receiving the missing item notice (YES at X5), the information processing center 7 displays the item on the display section 32a of the portable terminal unit 24 (X6). Then, the missing item is entered (X7). The data on the missing item thus entered is sent to the information processing center 7 (X8). The information processing center 7 receives this (Z6) and, when all of the retrieval conditions are ready, sends a reception complete notice to the portable terminal unit 24, and disconnects the communication line (YES at Z7, Z3, Z4).

As described above, with the portable terminal unit 24 provided with the service menus and condition item lists, the services that the user having the portable terminal unit 24 frequently uses can be entered in advance, the communication for the specification of service menus and the setting of condition items can be omitted, and a more efficient information processing can be realized. Furthermore, the capacity of the database 18 on the information processing center 7 side can be made smaller, thereby alleviating a burden on the information processing center 7 side.

As described above, because the information processing system of this embodiment can select the next database on the basis of the information obtained from the preceding process and automatically set a database to be used next, the user needs not select and access each database as with a conventional equivalent. Furthermore, because the data obtained from the databases undergoes the necessary computing process on the center 7 side, the user needs not perform the process, either.

While in the embodiment, "Travel" is selected for a category, another category may be used. For instance, such a category as event or fund management may be used. Although the place setting of San Francisco to Kyoto and the time setting of departure on Monday have been effected, the settings are not limited to place and time. As long as the settings correspond to the selected categories, other suitable settings may be effected.

Fourth Embodiment of the Present Invention

In the above embodiment, when the portable terminal unit 24 asks the information processing center to retrieve data about Travel, an answer is returned to the portable terminal unit 24. The answer may be transmitted to another terminal.

Figure 22:
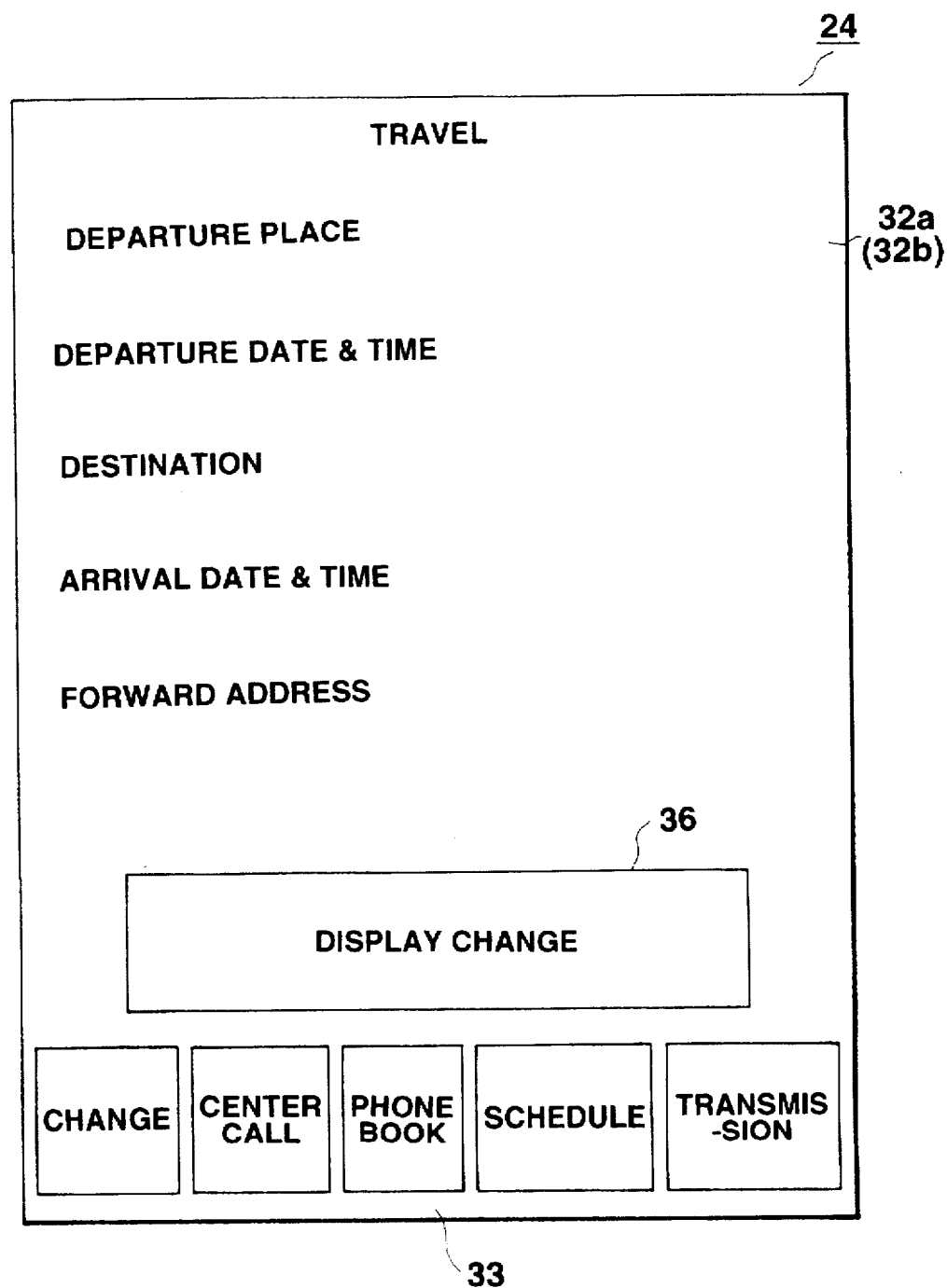
FIG. 22 shows the input to the portable terminal unit.
Figure 23:
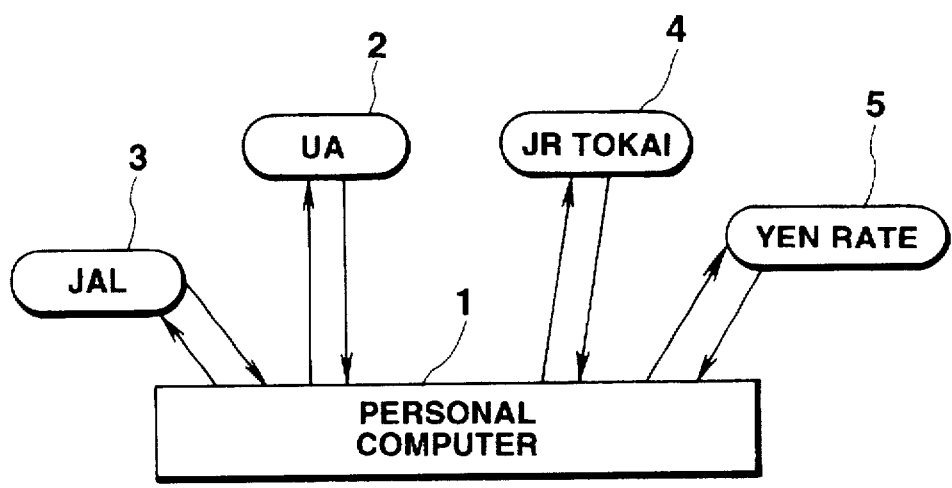
FIG. 23 is a schematic diagram of a conventional information processing system.

To achieve the transmission, at step ST5 where the user enters and transmits the retrieval conditions to the information processing center 7 of the first embodiment, the user also enters the user code at a forward address into the item "Forward Address" on the input screen as shown in FIG. 22, and the information processing center 7 transmits the retrieval result to the terminal of the user.

For example, if the user code of the personal computer 25 is "12346", writing the number in the forward address enables the result of the retrieval process requested by the portable terminal unit 24 to be sent to the personal computer 25.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A system for providing an information retrieval service with respect to a plurality of categories, said system comprising:

an information processing center;

a plurality of portable information terminals;

a plurality of databases; and a communication network connecting said information processing center, said portable information terminals and said plurality of databases, wherein:

(i) each of said portable information terminals includes:

a radio communication unit for performing data communication with said information processing center via said communication network;

means for sending a request for information retrieval to said information processing center;

first designation means for displaying a service menu containing a plurality of category names, and for enabling a user to designate one of the displayed category names;

second designation means for displaying an input item list containing a plurality of item data each specifying a respective information retrieval condition, and for enabling a user to designate one of the input item data; and means for sending a request to said information processing center to transfer a search result to another one of said portable information terminals; and (ii) said information processing center includes:

means for transmitting the service menu containing the plurality of category names to the requesting one of said portable information terminals which has sent the request for information retrieval via said radio-communication unit;

means for transmitting the input item list to the requesting one of said portable information terminals via said radio communication unit responsive to said first designation means designating one of the plurality of category names of the service menu;

means for selecting necessary databases of said plurality of databases based on the designated category name;

retrieval means for searching the selected necessary databases in a chain reaction manner using a retrieval result as a next retrieval condition so as to fulfill the specified retrieval condition corresponding to the item data designated by said second designation means;

means for making a connection with said another one of said portable information terminals to which the search result has been requested to be transferred when the information retrieval request has been processed and completed; and output means for sending the search result to said another one of said portable information terminals.

2. The system according to claim 1, wherein:

each of said portable information terminals and said information processing center include means for cutting off communication therebetween when data transmission and reception for the information retrieval request has been processed and completed; and said information processing center includes means for requesting reconnection with said requesting one of said portable information terminals when the information retrieval request has been processed and completed.

3. The system according to claim 2, wherein said information processing center includes a memory for storing a plurality of input item lists each corresponding to one of said plurality of categories.

4. The system according to claim 3, wherein said plurality of categories include travel, said plurality of databases include air service and train service, said retrieval conditions include departure place, departure time, and destination, and said search result includes information relating to methods of transportation and times of departure from a given departure place to a given destination.

5. The system according to claim 4, wherein each of said portable information terminals comprises a portable radio terminal.

6. An information processing device comprising:

means for connecting said information processing device with a plurality of databases via a communication network;

means for transmitting via a radio communication network a service menu including a plurality of categories to at least one of a plurality of portable information terminals which has made an information retrieval request;

means for receiving data indicating a selected one of the plurality of categories of the service menu from the at least one of the portable information terminals which has made the information retrieval request;

means for transmitting an input item list via the radio communication network to the at least one of the portable information terminals which has made the information retrieval request, said input item list including a plurality of item data corresponding to respective retrieval conditions of the selected one of the plurality of categories of the service menu;

means for receiving item data indicating a specified retrieval condition from the at least one of the portable information terminals which has made the information retrieval request;

means for selecting necessary databases from said plurality of databases on the basis of the selected one of the plurality of categories of the service menu;

retrieval means for searching the selected necessary databases in a chain reaction manner using a retrieval result as a next retrieval condition so as to fulfill the specified retrieval condition corresponding to the item data received from the at least one of the portable information terminals which has made the information retrieval request; and output means for sending a search result of said retrieval means to another one of said plurality of portable information terminals which has been designated by the at least one of the portable information terminals which has made the information retrieval request.

7. The system according to claim 6, further comprising:

means for cutting off communication between said information processing device and the at least one of the portable information terminals which has made the information retrieval request when said information processing device receives said selected one of the plurality of categories and said item data indicating a specified retrieval condition; and means for requesting the at least one of said plurality of portable information terminals which has made the information retrieval request to make a reconnection with said information processing device when a search result has been obtained by said retrieval means.

8. The system according to claim 7, further comprising means for notifying the at least one of the portable information terminals which has made the information retrieval request when the specified retrieval condition has not fulfilled conditions necessary for carrying out the information retrieval request.

9. The system according to claim 7, further comprising means for storing respective lists of the necessary databases for carrying out information retrieval requests in each of the plurality of categories of the service menu.

10. The system according to claim 9, wherein said plurality of categories include travel, said plurality of databases include air service and train service, said retrieval conditions include departure place, departure time, and destination, and said search result includes information relating to methods of transportation and times of departure from a given departure place to a given destination.

11. The system according to claim 10, wherein said output means also transmits the search result to the at least one of the portable information terminals which has made the information retrieval request.

12. A method of providing an information retrieval service over a system comprising an information processing center, a plurality of portable information terminals, a plurality of databases, and a communication network connecting said information processing center, said plurality of portable information terminals and said plurality of databases, said method comprising the steps of:

a) transmitting a service menu from said information processing center, via a radio network coupled to said communication network, to a given one of said plurality of portable information terminals which has made an information retrieval request, said service menu containing a plurality of categories from which information can be retrieved;

b) transmitting an item list from said information processing center via the radio network, said item list corresponding to a given one of said plurality of categories designated by a user of said given one of said plurality of portable information terminals which has made the information retrieval request;

c) sending a transfer request to said information processing center for transferring a search result to another one of said plurality of portable information terminals;

d) cutting off communication between said given one of said plurality of portable information terminals which made the information retrieval request when data transmission and reception for the information retrieval request has been processed and completed;

e) selecting necessary databases from said plurality of databases on the basis of said given one of said plurality of categories designated by the user of said given one of said plurality of portable information terminals;

f) searching the selected necessary databases in a chain reaction manner using a retrieval result as a next retrieval condition so as to fulfill a specified retrieval condition;

g) requesting connection with said another terminal to which the search result has been requested to be transferred when a searching operation has been completed;

h) sending the search result to said another one of said plurality of portable information terminals.

13. The method according to claim 12, further comprising the step of:

requesting reconnection between said given one of said plurality of portable information terminals which has made the information retrieval request and said information processing center when the information retrieval request has been processed and completed.

14. The method according to claim 12, wherein said step (b) comprises a step of searching a memory which has stored therein a plurality of item lists each corresponding to one of said plurality of categories.

15. The method according to claim 14, wherein said plurality of categories include travel, said plurality of databases include air service and train service, said retrieval conditions include departure place, departure time, and destination, and said search result includes information relating to methods of transportation and times of departure from a given departure place to a given destination.

* * * * *